(12) United States Patent
Nakamura et al.

(10) Patent No.: US 7,209,242 B2
(45) Date of Patent: Apr. 24, 2007

(54) NON-CONTACT SURFACE CONFIGURATION MEASURING APPARATUS AND METHOD THEREOF

(75) Inventors: Katsushige Nakamura, Chofu (JP); Katsuhiro Miura, Mitaka (JP); Hideo Kotajima, Fuchu (JP)

(73) Assignee: Mitaka Kohki Co., Ltd., Tokyo (JP)

( * ) Notice: Subject to any disclaimer, the term of this patent is extended or adjusted under 35 U.S.C. 154(b) by 150 days.

(21) Appl. No.: 11/033,133

(22) Filed: Jan. 12, 2005

(65) Prior Publication Data
US 2005/0151978 A1 Jul. 14, 2005

(30) Foreign Application Priority Data
Jan. 13, 2004 (JP) ............................. 2004-005389

(51) Int. Cl.
*G01B 11/24* (2006.01)
(52) U.S. Cl. ...................... 356/601; 356/608; 356/609; 356/622
(58) Field of Classification Search ........ 356/601–623, 356/124–127; 250/201.2, 201.4; 359/368, 359/813
See application file for complete search history.

(56) References Cited

U.S. PATENT DOCUMENTS 5,369,490 A * 11/1994 Kawai et al. ............... 356/601
5,594,235 A * 1/1997 Lee .......................... 250/201.3
6,649,893 B2 * 11/2003 Fujimoto et al. .......... 250/201.2
6,741,364 B2 * 5/2004 Lange et al. ............... 356/622
2003/0117632 A1* 6/2003 Golini et al. ............... 356/512

FOREIGN PATENT DOCUMENTS

| EP | 1 324 006 A1 | 7/2003 |
| JP | 62-075411 A1 | 4/1987 |
| JP | 2000-146532 A1 | 5/2000 |

OTHER PUBLICATIONS

EPO Search Report mailed on May 4, 2005.
Klaus Ehmann, et al., "A 3D optical profilometer using a compact disc reading head" Measurement Science and Technology, vol. 9, No. 2, Aug. 1998, pp. 1259-1265, XP002325648.
H. J. Tiziani, et al., "Dual-wavelength heterodyne differential interferometer for high-precision measurements of reflective aspherical surfaces and step heights", Applied Optics, Optical Society of America, Washington, U.S., vol. 35, No. 19, Jul. 1, 1996, pp. 3525-3533, XP000620093, ISSN: 0003-6935.

(Continued)

*Primary Examiner*—Hoa Q. Pham
(74) *Attorney, Agent, or Firm*—Rader Fishman & Grauer

(57) ABSTRACT

A non-contact surface configuration measuring method is provided which allows for accurate measurement of a surface which is at a steep angle to a laser probe. Specific areas including parts inclined ±30° or more from an optimum measurement state relative to the laser probe are measured after a workpiece is rotated such that the surface within the specific areas is less than ±30°. Therefore, accurately measured data on the specific areas can be obtained even in a different coordinate system from that of a general area.

7 Claims, 6 Drawing Sheets

OTHER PUBLICATIONS

David J. Aziz, "Interferometric measurement of surface roughness in engine cylinder walls", Optical Engineering, Soc. of Photo-Optical Instrumentation Engineers, Bellingham, U.S., vol. 37, No. 5, May 1998, pp. 1429-1434, XP000777066, ISSN: 0091-3286.

James C. Wyant, et al., "Computerized Interferometric Measurement of Surface Microstructure", SPIE Proceedings-Optical Inspection and Micromeasurements, vol. 2782, Jun. 10, 1996, pp. 26-37, XP002325649.

* cited by examiner

NON-CONTACT SURFACE CONFIGURATION MEASURING APPARATUS AND METHOD THEREOF

BACKGROUND OF THE INVENTION

1. Field of the Invention

This invention relates to a non-contact surface configuration measuring method with a laser probe system.

2. Description of the Related Art

For measuring the surface configuration of a workpiece (object) with a given shape, a non-contact surface configuration measuring method is known in which a workpiece to be measured is placed on a scanning stage; the workpiece is moved by the scanning stage in an X-direction at predetermined intervals while a laser probe is automatically focusing on the surface of the workpiece in a Z-direction; and the surface configuration of the workpiece is determined from the amount of movement in the Z-direction of an objective lens in an autofocus optical system.

SUMMARY OF THE INVENTION

In the above-described conventional art, however, a laser beam passing through the objective lens in the autofocus optical system is applied to the surface of the workpiece, and a part of the laser beam reflected off the surface and returned to the objective lens is guided to an AF sensor for control. Therefore, if a surface to which a laser beam is applied is at a steep angle to the laser probe, a part of the laser beam returned to the objective lens is significantly reduced, and thus accurate measurement is difficult. It is known that, in measurement with a precision of 0.1 μm or less, if a surface to which a laser beam is applied is at a ±30° or more different angle from a right angle to the laser probe, the returned part of the reflected laser beam is reduced, and accurate measured data cannot be obtained.

The present invention has been made in view of the above-described conventional art, and provides a non-contact surface configuration measuring method that allows for accurate measurement of a surface which is at a steep angle to a laser probe.

According to a first technical aspect of the present invention, there is a non-contact surface configuration measuring apparatus provided for measuring the surface configuration of an object. The apparatus comprises a position detector configured to detect the position of the surface of the object, the position detector being fixed in position relative to the apparatus, and configured to direct a laser beam passing through an optical path around an optical axis of an objective lens, via the objective lens to the object, and form an image of a laser beam reflected from the surface of the object through the objective lens onto a photo detector, in order to detect the position of the surface relative to the direction of the optical axis; and a scanner configured to support the object and move in a second direction which intersects the optical axis, the scanner being fixed in position relative to the apparatus and being able to rotate the object about an imaginary axis parallel to a third direction which intersects the optical axis and the second direction. A range of angles which a normal vector to the surface of the object forms with the optical axis is set for the position detector to detect the position of the surface with a predetermined position accuracy. A first continuous area in which a normal vector being perpendicular to the object surface, falls within a range of angles and is defined on the surface of the object fixed on the scanner. A second continuous area of the object surface overlapping the first area at an edge thereof is defined. First position information on the first area is obtained. Second position information on the second area is obtained with the object rotated at a predetermined angle about the virtual axis parallel to the third direction by the scanner so that a normal vector to the surface within the second area falls within the range of angles. The first position information is overlapped with the second position information such that respective position information pieces on the overlap surface of the object substantially agree.

According to a second technical aspect of the present invention, there is a non-contact method of measuring a surface configuration of an object provided with a detector configured to direct a laser beam passing through an optical path around an optical axis of an optical system, via the optical system to the object, and to detect a laser beam reflected from the surface of the object in the direction of the optical axis to detect the position of the surface in the optical axis direction, along a second direction intersecting the optical axis direction. The method comprises the steps of setting a range of angles which a normal to the surface of the object forms with the optical axis direction, for detection of the position with a predetermined accuracy; defining a first continuous area in which a normal vector to the object surface falls within the range of angles, on the surface of the object; defining a second continuous area of the object surface overlapping the first area at an edge thereof; obtaining first position information on the first area; obtaining second position information on the second area with the object rotated at a predetermined angle on an imaginary axis intersecting the optical axis direction and the second direction so that a normal vector to the surface within the second area falls within the range of angles; and overlapping the first position information and the second position information such that respective position information pieces on the overlap surface of the object substantially agree.

DESCRIPTION OF THE PREFERRED EMBODIMENTS

Figure 1:
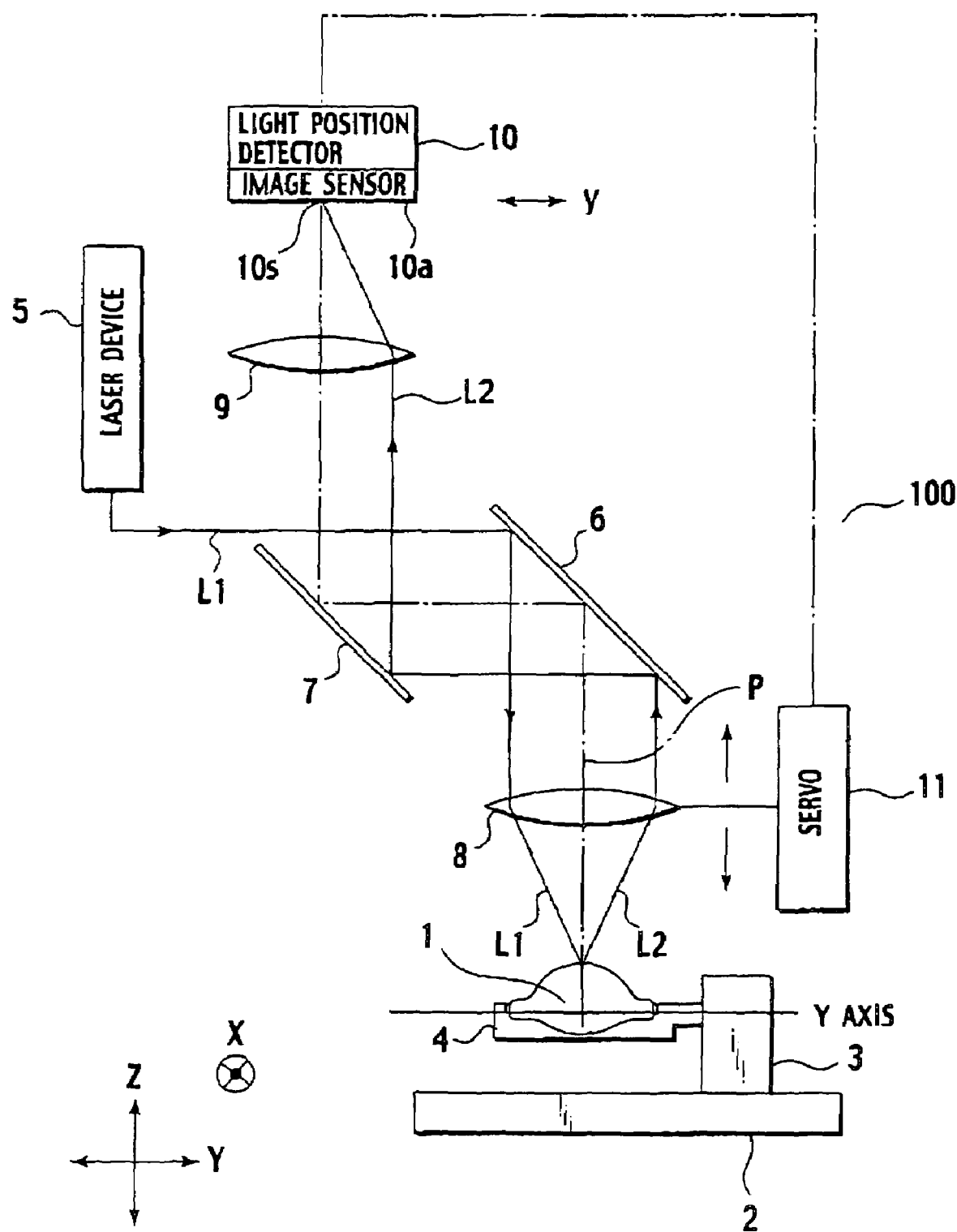
FIG. 1 is a schematic diagram illustrating the structure of a laser-probe-type configuration measuring apparatus.

A preferred embodiment of the present invention will be described below with reference to FIGS. 1 to 8C. FIG. 1 is a diagram showing the structure of a laser-probe-type configuration measuring apparatus 100 according to this embodiment. In FIG. 1, an X-direction and a Y-direction are two intersecting directions in a plane, and typically, are horizontal directions orthogonal to each other. A Z-direction is a direction intersecting the above-described plane, and typically, is plumb.

A workpiece 1 as an object to be measured and illustrated in FIG. 1, is an aspherical lens having an aspherical and axisymmetric surface. A scanning stage 2 is configured to precisely move in the X- and Y-directions. In this embodiment, the X-direction is a scanning direction. A rotating stage 3 is placed on the scanning stage 2. The rotating stage 3 is provided with a rotating shaft 4 which rotates about a Y-axis. The workpiece 1 is fixed in position relative to the rotating shaft 4.

A laser beam L1 is applied to the surface of the workpiece 1 from a laser irradiation device 5 via an auto focus optical system. More specifically, the laser beam L1 from the laser irradiation device 5 is reflected by the mirror 6 onto the surface of the workpiece 1 through an objective lens 8 which has an optical axis P in parallel to the Z-direction. The laser beam L1 applied to the workpiece 1 constitutes what is called a "laser probe."

A part L2 of the laser beam reflected off the surface of the workpiece 1 passes through the objective lens 8 again, and is reflected by the two mirrors 6, 7, through an imaging lens 9, onto a light position detector 10 to form an image. The light position detector 10 includes an image sensor 10a for detecting a shift of a light spot in a y-axis direction corresponding to the Y-axis direction. The image sensor 10a is typically a photo sensor split into two parts which are spaced in the y-direction. The emitted laser beam L1 travels along an optical path deviated off the optical axis (principal axis) P of the objective lens 8 into the objective lens 8, and is refracted onto the surface of the workpiece 1. A laser beam L2 reflected off the surface of the workpiece 1 passes through the objective lens 8 along an optical path on the opposite side to that of the emitted laser beam L1 with respect to the optical axis P, and through the mirrors 6, 7 and the imaging lens 9 to the image sensor 10a. With movement of the objective lens 8 in a Z-direction, the angle of radiation of the emitted laser beam L1 from the objective lens 8 and the angle of incidence of the reflected laser beam L2 into the objective lens 8 change. The laser beams L1, L2 used in measurement are thus located substantially within a Y-Z plane. As a result, when the optical system including the objective lens 8 and the imaging lens 9 do not form an image on the image sensor 10a, the reflected laser beam L2 reaches a position off a center 10s. When it forms an image, the reflected laser beam L2 reaches the center 10s. Thus, the imaging condition can be checked by detecting the imaging position of the reflected laser beam L2.

Specifically, when the reflected laser beam L2 shifts from the center 10s of the light position detector 10 in a y-direction, a servomechanism 11 moves the objective lens 8 in a focusing direction (Z-direction) to correct the shift (auto focus control). As a result, the laser beam is controlled to constantly form an image on the image sensor 10a. Thus, from the amount of movement of the objective lens 8, the position in the Z-direction of the surface of the workpiece 1, or the configuration thereof can be determined. The objective lens 8, the imaging lens 9, the light position detector 10, the servomechanism 11 and so on constitute an auto focus optical system.

When the laser beam L is automatically focused on the surface of the workpiece 1, the scanning stage 2 on which the workpiece 1 is placed via the rotating stage 3 is moved in the X-direction, thereby to continuously measure the position of the surface of the workpiece 1 in the scanning direction. After completion of single scanning in the X-direction, the workpiece 1 is moved in the Y-direction and measured again in the X-direction. Repetition of the measurement enables measurement of the three-dimensional configuration of the surface of the workpiece 1.

Figure 2:
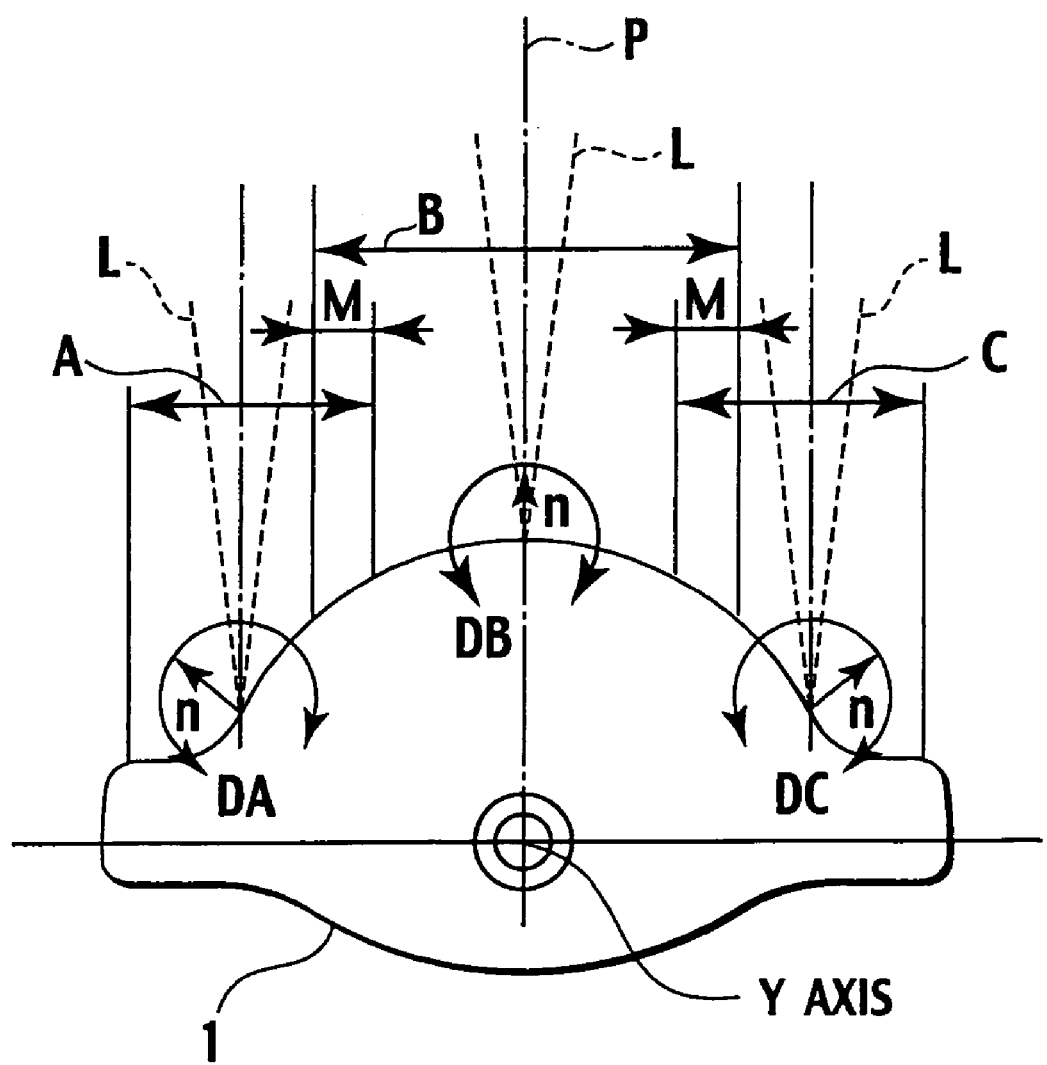
FIG. 2 is a cross-sectional view illustrating a general area and specific areas of a workpiece.
Figure 3A:
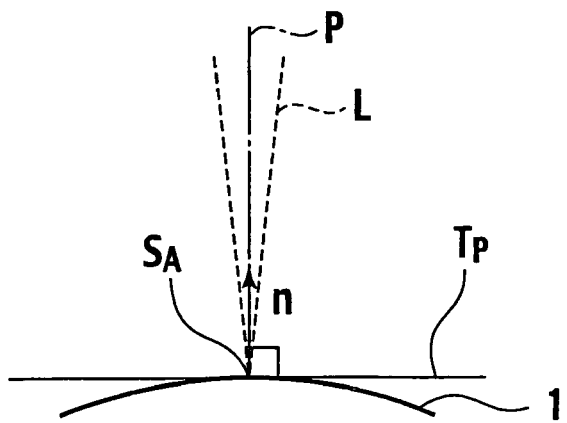
FIGS. 3A to 3C are cross-sectional views showing surface angles with respect to an optimum measurement state in the general and specific areas of the workpiece.
Figure 3B:
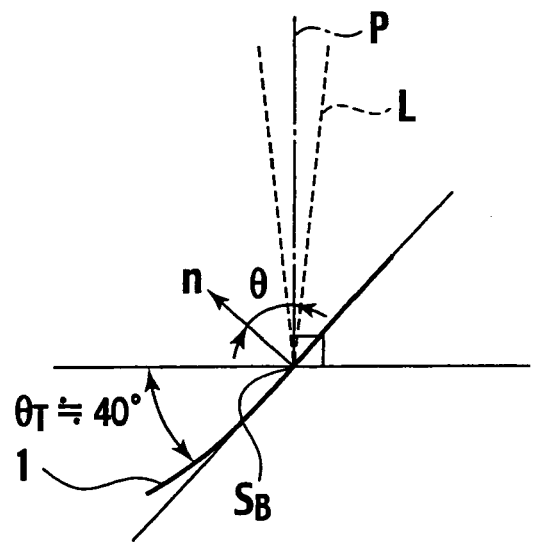
Figure 3C:
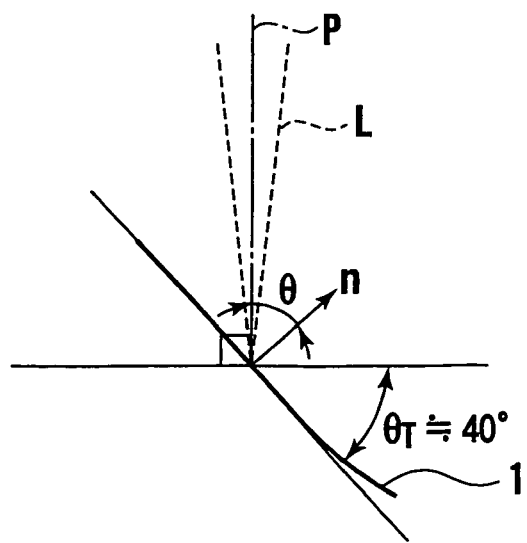
Figure 4:
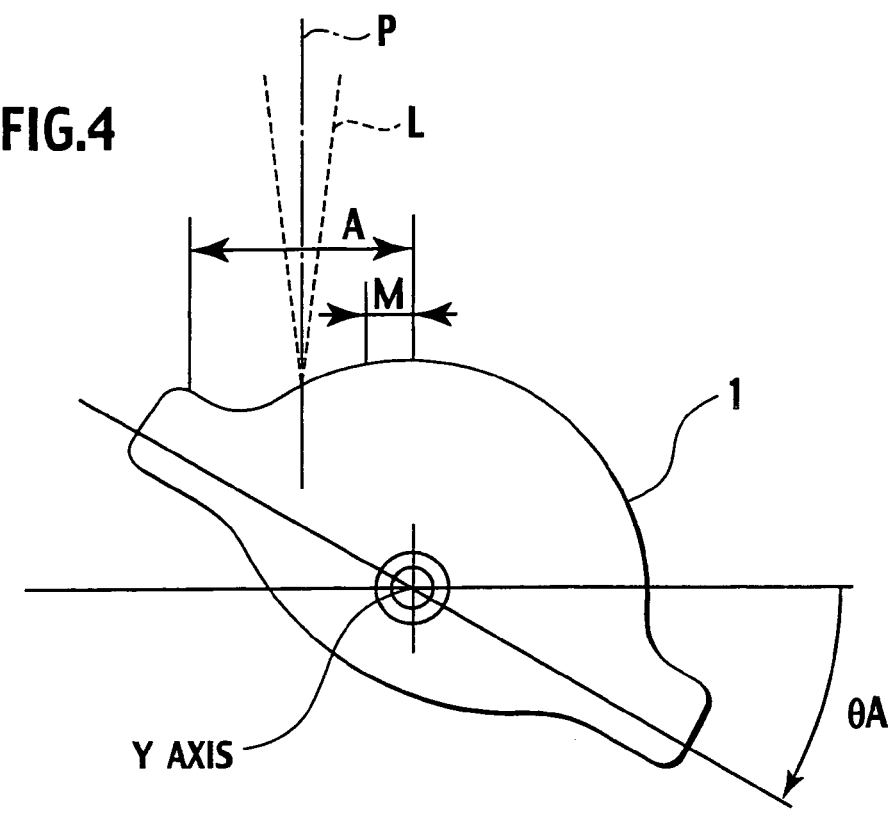
FIG. 4 is a cross-sectional view of the workpiece measured in one of the specific areas.
Figure 5:
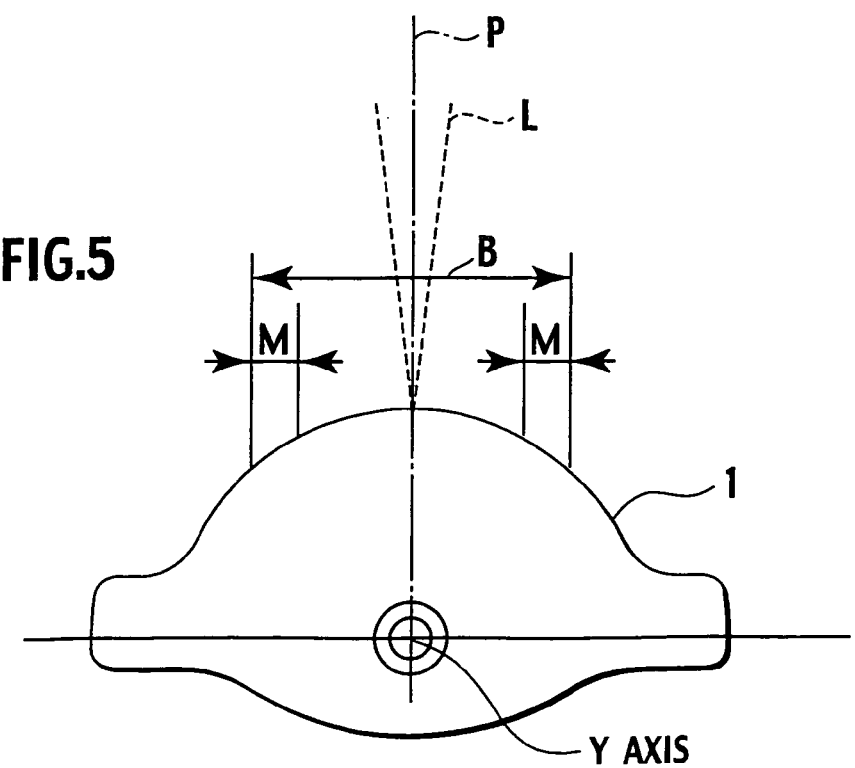
FIG. 5 is a cross-sectional view of the workpiece measured in the general area.
Figure 6:
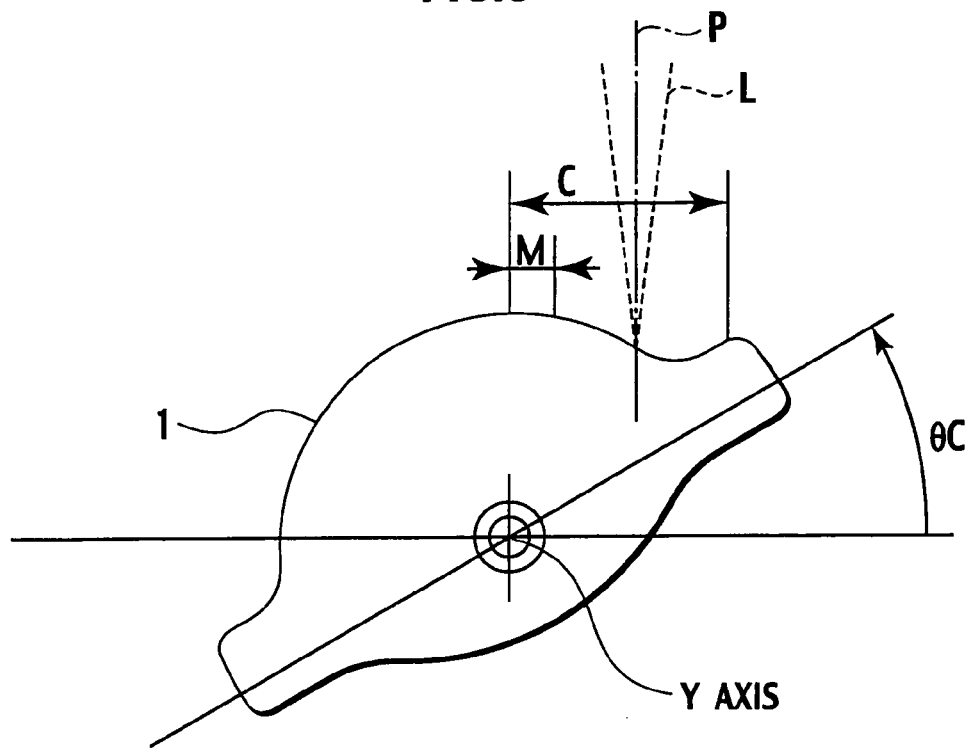
FIG. 6 is a cross-sectional view of the workpiece measured in the other specific area.

FIG. 2 is a view of the workpiece 1 taken in the Y-direction. A part of a laser beam L used for measurement is reflected along an imaginary plane including the Y-axis and the Z-axis, thus constituting a laser probe constantly radiating the surface of the workpiece 1 in a plumb direction (Z-direction), when viewed in the Y-direction.

The surface of the workpiece 1 is increased in inclination from its center to the periphery. With the increase in inclination, the normal vector to the surface forms a larger angle with the optical axis P of the objective lens 8. Specifically, as shown in FIGS. 2 and 3A to 3C, at the central top of the workpiece 1 (shown by arrows DB in FIG. 2), a tangent to the surface at a laser beam reflection point SB has an inclination θT of zero to the Y-axis, and the normal vector n to the surface is parallel to the optical axis P (this state is referred to as an optimum state). As the distance from the central top is increased, a tangent to the surface (a line of intersection of a tangent plane and the Y-Z plane) has a gradually increased gradient with respect to the Y-axis. The largest inclination θT of the surface is about 40° in peripheral areas (parts shown by arrows DA, DC). Generally speaking, the angle θ which the normal vector n to the surface forms with the optical axis P (hereinafter referred to as an inclination angle) is about 40° in peripheral areas. When a surface configuration of an object is measured with a predetermined position accuracy, there is a range of inclination angles Δθ (optimum range) in which accurate measurement can be made. Outside the range, the intensity of a reflected laser beam drops sharply, making it difficult to measure with predetermined accuracy. In the case where the position accuracy is set at 0.1 μm or less, it is desirable that the inclination angle Δθ be typically within the range of −30°≦Δθ≦+30°. The inclination angle θ of the normal vector n is positive clockwise with respect to the optical axis P in the figure. Hereinafter a description will be made with a predetermined inclination angle in the range of |Δθ|≦30°.

In this embodiment, a total scanning area of the workpiece 1 in the X-direction is divided into a single continuous general area B in which the surface of the workpiece 1 has an optimum range of inclination angles Δθ within the predetermined range (|Δθ|≦30°) with respect to the optimum measurement state, and two continuous specific areas A, C including parts in which the inclination angle θ is outside the predetermined range. The general area B and the specific areas A, C include overlap measurement parts M at which the adjacent areas overlap. Each area is scanned to obtain measured data.

Figure 7:
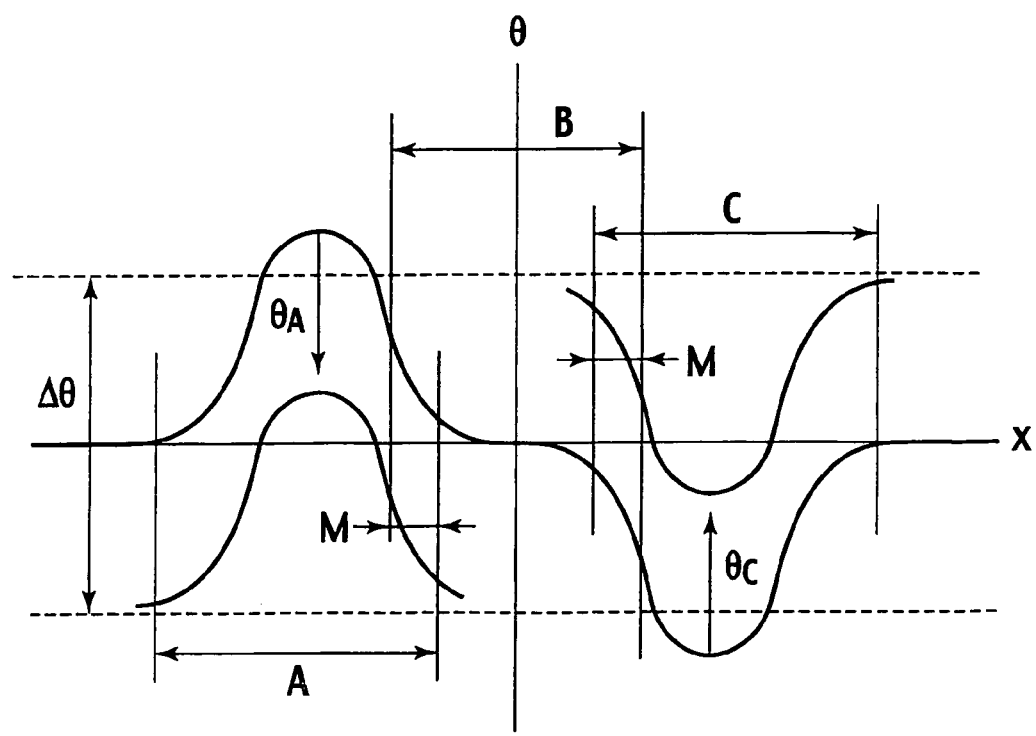
FIG. 7 is a graph showing the inclination distribution of the workpiece surface and inclination angle shifts.

FIG. 7 is a schematic graph showing the inclination angle θ of the normal vector n to the workpiece surface with respect to the optical axis P along the scanning direction (X-axis direction), and an inclination angle shift in each area. The horizontal axis (x) is the reference scanning direction, and is typically the scanning direction (X-axis) in the general area B. The entire area B (general area) of the measured areas is within the optimum range of inclination angles Δθ, while the area A (specific area) and the area C (specific area) are partly beyond the optimum range Δθ. For this, the specific areas are shifted by a predetermined inclination angle to enable measurement within the optimum range Δθ. Specifically, with reference to FIG. 7, the inclination angle of the surface in area A is reduced by θA so that the entire area (including the overlap area M) falls within the optimum range. Also, the inclination angle of the surface in area C is increased by θC so that the entire area falls within the optimum range.

That is, in the general area B, the workpiece 1 is scanned without being rotated relative to the laser beam L to obtain measured data. In the specific areas A, C, the workpiece 1 is rotated at a predetermined angle on the Y-axis so that all inclination angles of the surface in each specific area A, C are within the predetermined range with respect to the optimum measurement state, and then scanned to obtain measured data.

Now, with reference to FIGS. 4 to 8C, a practical measurement process will be described.

Measurement of Specific Area A

First, the rotating shaft 4 on the rotating stage 3 is rotated about the Y-axis by the inclination angle ΔA (=about −40°) so that all inclination angles of the surface within the specific area A along a scanning line are within the range of ±30° which is the optimum range. In this embodiment, the rotation angle of the workpiece 1 is determined based on the part having the largest surface inclination in the specific area A, which is not necessarily required. Any rotation angle can be selected as long as after rotation at that angle, all inclination angles of the surface within the specific area A are within the range of ±30° with respect to the optimum measurement state. After rotation of the workpiece 1 is finished, the scanning stage 2 is moved at predetermined intervals in the X-direction to obtain measured data Da on the surface configuration of the entire specific area A including the overlap measurement part M. The measured data Da is a data array composed of (i+q') data, such as Da{a1, a2, . . . ai, m'1, m'2, . . . m'q'}, which includes an overlap data array Dm1'{m'1, m'2, . . . m'q'}.

Measurement of General Area B

The rotating shaft 4 on the rotating stage 3 is turned back to return the workpiece 1 to an initial state. As a result, the general area B is returned to the state that is not rotated relative to the laser beam L, and all inclinations of the surface within the general area B along a scanning line with respect to the optimum state are within the optimum range ±30°. With this state, the scanning stage 2 is moved at predetermined intervals in the X-direction to obtain measured data Db on the surface configuration of the entire general area B including the overlap measurement part M. The measured data Db is a data array composed of (j+q+s) data, such as Db{m1, m2, . . . mq, b1, b2, . . . bj, n1, n2, . . . ns}, which includes an overlap data array Dm1{m1, m2, . . . mq} and Dm2{n1, n2, . . . ns}.

Measurement of Specific Area C

The rotating shaft 4 on the rotating stage 3 is rotated about the Y-axis by the same predetermined angle θC (=about +40°) in the opposite direction to that of the specific area A so that all inclinations of the surface within the specific area C along a scanning line relative to the optimum state are within the range of inclination angles ±30°. After rotation of the workpiece 1 is finished, the scanning stage 2 is moved at predetermined intervals in the X-direction to obtain measured data Dc on the surface configuration of the entire specific area C including the overlap measurement part M. The measured data Dc is a data array composed of (k+s') data, such as Dc{n'1, n'2, . . . n's', c1, c2, . . . . ck}, which includes an overlap data array Dm2'{n'1, n'2, . . . n's'}.

Merging of Measured Data

Figure 8A:
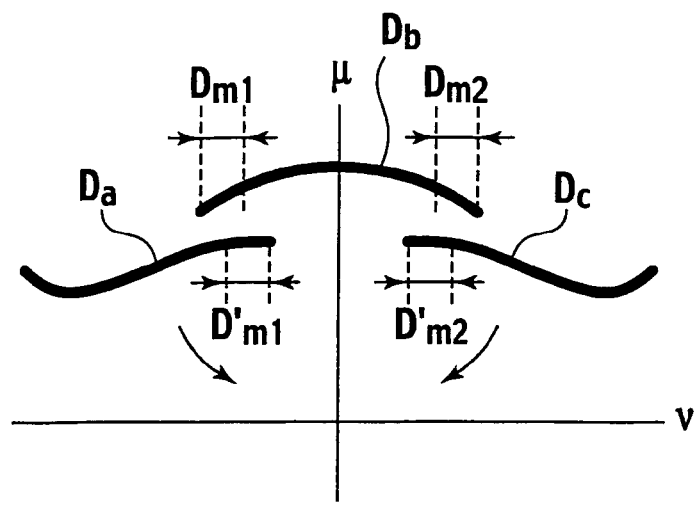
FIGS. 8A to 8C are graphs showing a process of merging measured data.
Figure 8B:
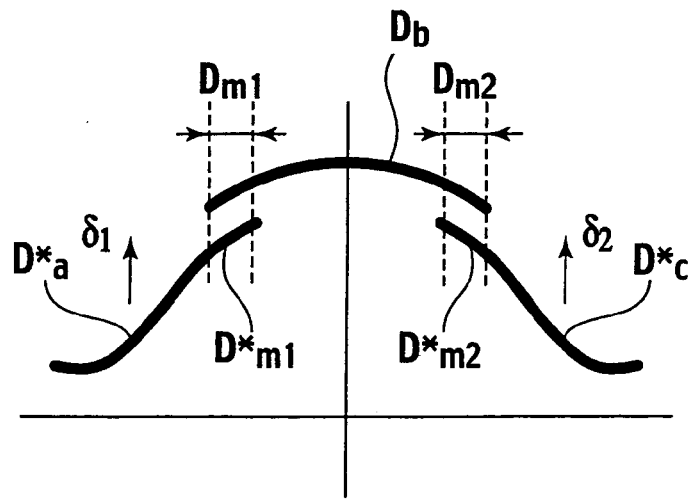
Figure 8C:
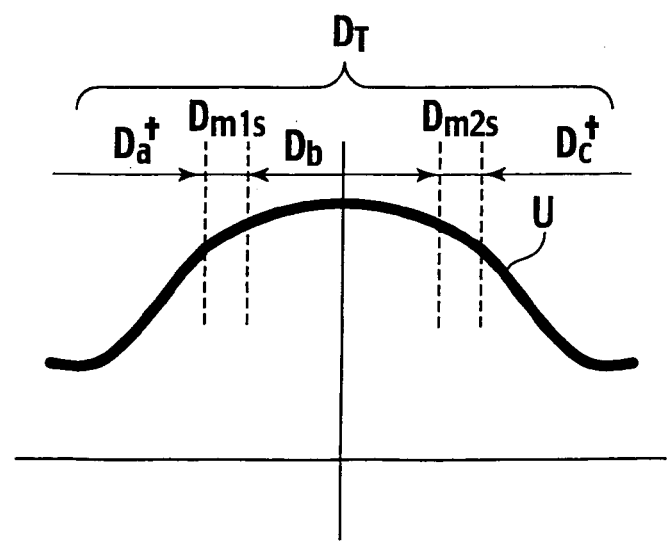

As shown in FIGS. 8A to 8C, the obtained measured data pieces Da, Db, Dc are merged. The horizontal axis (v) corresponds to the distance along a particular scanning direction, and the vertical axis (μ) represents the value of measured data or computed data corresponding to the distance in the optical axis direction. FIG. 8A shows the measured data piece Db on the general area B not rotated, which is selected as reference data array, and the measured data pieces Da, Dc on the rotated specific areas A, C, in the coordinate system of the reference data. The measured data piece Db on the general area B and the measured data pieces Da, Dc on the specific areas A, C include overlap data pieces on the overlap measurement areas M. Thus, the overlap data pieces are used to merge the measured data pieces Da, Db, Dc.

First, as shown in FIG. 8B, the measured data pieces Da, Dc on the specific areas A, C are rotated by polar coordinate transformation to correct the inclinations of the measured data pieces Da, Dc on the specific areas A, C. Specifically, the measured data arrays Da{a1, a2, . . . ai, m'1, m'2, . . . m'q'} and Dc{n'1, n'2, . . . n's', c1, c2, . . . ck} are transformed by polar coordinate transformation into data arrays Da*{a*1, a*2, . . . a*i, m*1, m*2, . . . m*q'} and Dc*{n*1, n*2, . . . n*s', c*1, c*2, . . . c*k} which are comparable with the reference measured data array Db.

As a result, an overlap data array $Dm_1^*${m*1, m*2, . . . m*q'} of the data array Da* constitutes a configuration data array on the same area as that of the overlap data array $Dm_1${m1, m2, . . . mq} of the reference measured data Db on the general area B. Likewise, an overlap data array $Dm_2^*${n*1, n*2, . . . n*s'} of the data array Dc* constitutes a configuration data array on the same area as that of the overlap data array $Dm_2${n1, n2, . . . ns} of the measured data Db.

Thus, the data array Da* is entirely shifted in the Z-direction and overlapped for the best correlation between the overlap data arrays $Dm_1^*$ and $Dm_1$ corresponding to each other. With the amount of the shift as $δ_1$, the shifted configuration data array on the A area is $Da^†${a*1+$δ_1$, a*2+$δ_1$, . . . a*i+$δ_1$, m*1+$δ_1$, m*2+$δ_1$, . . . m*q'+$δ_1$}. The configuration expressed by the overlap area data array $Dm_1^†${m*1+$δ_1$, m*2+$δ_1$, . . . m*q'+$δ_1$} almost agrees with the configuration expressed by the B area overlap data array $Dm_1${m1, m2, . . . mq}. As a result, the statistical error between the overlap data arrays $Dm_1^†$ and Dm1 is minimized (FIG. 8C). Likewise, the data array Dc* is entirely shifted in the Z-direction and overlapped for the best correlation between the corresponding overlap data arrays $Dm_2^*$ and $Dm_2$. With the amount of the shift as 62, the shifted C area configuration data array is $Dc^†${n*1+$δ_2$, n*2+$δ_2$, . . . n*s'+$δ_2$, c*1+$δ_2$, c*2+$δ_2$, . . . c*k+$δ_2$}.

In this embodiment, since the measured data Db on the central general area B is selected as reference data, overlapping of the measured data pieces Da, Dc on the specific areas A, C with the measured data piece Db on the general area B is done only once (minimum number) for data merging, resulting in an increased processing speed when merging. If the measured data Da on the specific area A is used as a reference, for example, the measured data Db on the general area B is overlapped with the measured data Da, and then, with the overlapped measured data Db on the general area B, the measured data Dc on the specific area C is overlapped. Thus, overlapping is done two times, resulting in a complex computation.

Finally, as shown in FIG. 8C, the measured data piece Db on the general area B and the measured data pieces Da, Dc on the specific areas A, C become continuous with the overlap data pieces Dm as connecting data. One of the overlap data pieces Dm in agreement is deleted to create entirely merged data U. Since the connecting overlap data pieces Dm have nearly equal amounts of data, the merged data U can be provided with high precision and reliability.

More specifically, the configuration data arrays on the areas A, B and C of the workpiece 1 are overlapped appropriately to create a single continuous data array $D_T = Da^\dagger + Dm_{1s} + Db + Dm_{2s} + Dc^\dagger = \{a*1+\delta_1, a*2+\delta_1, \ldots a*i+\delta_1; m1_s, m2_s, \ldots mq''_s; b1, b2, \ldots bj; n1_s, n2_s, \ldots ns''_s; c*1+\delta_2, c*2+\delta_2, \ldots c*k+\delta_2\}$ (FIG. 8C). The data array $Dm_{1s}\{m1_s, m2_s, \ldots mq''_s\}$ is a configuration data array on the overlap area M between the A area and the B area, and is the configuration data $Dm_1$ on the B area, the configuration data $Dm_1*$ on the A area, or statistical data of those data pieces averaged. Also, the data array $Dm_{2s}\{n1_s, n2_s, \ldots ns''_s\}$ is a configuration data array on the overlap area M between the B area and the C area, and is the configuration data $Dm_2$ on the B area, the configuration data $Dm_2*$ on the C area, or statistical data of those data pieces averaged.

As described above, according to this embodiment, even on the specific areas A, C of the surface of the workpiece 1 including parts at which the inclination angle to the laser beam L is outside the range of ±30°, the accurate measured data pieces Da, Dc can be obtained because, before measurement, the workpiece 1 is rotated so that a difference in angle of the surface within the specific areas A, C from the optimum measurement state relative to the laser beam L is within the range of ±30° for measurement. The obtained data pieces can be merged with the measured data Db on the general area B using the overlap data pieces Dm, to determine the precise surface configuration of the workpiece 1 from the merged data U. Since measurement in the specific areas A, C is performed not during rotation but after rotation, the precision of rotation of the rotating stage 3 has no influence. Therefore, a high-precision rotating stage is not required, which results in easy manufacturing of the apparatus and an advantage in keeping the cost to a minimum.

Since the rotating stage 3 provided with the rotating shaft 4 for fixing the workpiece 1 thereon is mounted on the scanning stage 2 which moves at least in the X direction, it can be retrofitted to the existing scanning stage 2, requiring no significant change to the stage 2.

According to the present invention, before measurement of specific areas of an entire scanned area on the surface of a workpiece, specific areas, including parts inclined beyond a predetermined angle range from an optimum measurement state relative to a laser probe, the workpiece is rotated so that a difference in the angle of the surface within the specific areas from the optimum measurement state relative to the laser probe is within the predetermined range for measurement. Therefore, accurately measured data pieces on the specific areas can be obtained even though they are in a different coordinate system from that of the general area. Since obtained measured data pieces on the general area and the specific areas are overlapped with those on the adjacent areas, merged data on the entire scanned area can be created by making the measured data pieces on the areas continuous with the overlap data pieces superimposed on each other, to determine the surface configuration of the workpiece from the merged data. Since measurement in the specific areas is performed not during rotation but after rotation, the precision of rotation has no influence. Therefore, a high-precision rotating stage is not required, which results in easy manufacturing of the apparatus and an advantage in keeping the cost to a minimum. The expression "entire scanned area" as recited herein does not mean the entire surface of a workpiece exposed in a range of 180° or in a range of 360°, but means an entire area of an exposed surface to be measured by an operator.

To overlap and merge measured data with reference measured data, reference measured data for overlapping is selected such that overlapping is done a minimum number of times, which results in an increased processing speed for merged data.

Since a rotating stage provided with a rotating shaft for fixing a workpiece thereon is mounted on a scanning stage which moves at least in an X direction, it can be retrofitted to the existing scanning stage, requiring no significant change to the stage.

According to the present invention, a surface configuration of a workpiece having a steep slope, such as an aspherical lens or a spherical lens, can be accurately measured in an entire scanned area, which facilitates research and development of such a lens.

In this embodiment, the workpiece 1 is an aspherical lens, but is not limited thereto. It may be any measured object having a steep slope beyond a predetermined range of inclination angles with respect to an optimum measurement state, such as a spherical lens. A one-side surface of the workpiece 1 (in the range of about 180°) is measured in this embodiment, but the entire periphery of the workpiece 1 (in the range of 360°) can also be measured by increasing divisions of the general area B and the specific areas A, C.

This application claims benefit of priority under 35USC §119 to Japanese Patent Applications No. 2004-005389, filed on Jan. 13, 2004, the entire contents of which are incorporated by reference herein. Although the invention has been described above by reference to certain embodiments of the invention, the invention is not limited to the embodiments described above., Modifications and variations of the embodiments described above will occur to those skilled in the art, in light of these teachings. The scope of the invention is defined with reference to the following claims.

What is claimed is:

1. A non-contact surface configuration measuring apparatus for measuring a surface configuration of an object, the apparatus comprising:

a position detector configured to detect a position of a surface of the object, the position detector being fixed relative to the apparatus, and configured to direct a laser beam passing through an optical path around an optical axis of an objective lens, via the objective lens to the object, and form an image of a laser beam being reflected from a surface of the object through the objective lens onto an image sensor, to detect a position of the surface in a direction of the optical axis; and a scanner configured to support the object and move the object in at least one of a first direction and a second direction, the first and second directions being oriented in an X-Y plane defined by an X-axis and a Y-axis extending perpendicularly to one another, the X-Y plane perpendicularly intersecting the optical axis, the scanner being fixed relative to the apparatus and being able to rotate the object about a third imaginary axis extending parallel to the Y-axis which perpendicularly intersects the optical axis; wherein, a range of angles in which a normal vector to the surface of the object forms with the optical axis is set for the position detector to detect the position of the surface with a predetermined position accuracy;

a first continuous area in which a normal vector to the object surface falls within the range of angles is defined on the surface of the object fixed on the scanner;

a second continuous area of the object surface overlapping the first area at an edge thereof is defined;

first position information on the first area is obtained; and second position information on the second area is obtained with the object rotated at a predetermined angle about the third imaginary axis by the scanner so that a normal vector to the surface within the second area falls within the range of angles; and the first position information is overlapped with the second position information such that respective position information pieces on the overlap surface of the object substantially agree.

2. A non-contact surface configuration measuring apparatus of claim 1, wherein the position detector is provided with an autofocus optical system in which the objective lens is moved in an optical axis direction thereof, thereby to form an image of the reflected laser beam on the image sensor.

3. A non-contact surface configuration measuring apparatus of claim 1, wherein the range of angles is from −30° to +30° with respect to the optical axis.

4. A non-contact method of measuring a surface configuration of an object with a detector configured to direct a laser beam passing through an optical path around an optical axis of an optical system, via the optical system to the object, and detect a laser beam being reflected from a surface of the object in a direction of the optical axis to detect a position of the surface in the optical axis direction, along a second direction intersecting the optical axis direction, the method comprising the steps of:

setting a range of angles in which a normal vector to the surface of the object forms with the optical axis direction, for detection of the position with a predetermined accuracy;

defining a first continuous area in which a normal vector to the object surface falls within the range of angles, on the surface of the object;

defining a second continuous area of the object surface overlapping the first area at an edge thereof;

obtaining first position information on the first area;

obtaining second position information on the second area with the object rotated at a predetermined angle on an imaginary axis intersecting the optical axis direction and the second direction so that a normal vector to the surface within the second area falls within the range of angles; and overlapping the first position information and the second position information such that respective position information pieces on the overlap surface of the object substantially agree.

5. A non-contact surface configuration measuring method of claim 4, wherein the range of angles is +30° with respect to the optical axis direction.

6. A measuring method of claim 4, further comprising the steps of:

defining a third continuous area of the object surface overlapping the first area at another edge thereof, after the step of defining the second area;

obtaining third position information on the third area with the object rotated at a predetermined angle on the imaginary axis so that a normal vector to the surface within the third area falls within the range of angles, after the step of obtaining the second position information; and overlapping the first position information and the third position information such that respective position information pieces on the overlap surface of the object substantially agree, after the step of overlapping the first and second information.

7. A measuring method of claim 6, wherein the object is either a spherical lens or an aspherical lens.

* * * * *